United States Patent

[11] 3,542,068

[72] Inventor William A. Prescott
Grandview, Missouri
[21] Appl. No. 639,886
[22] Filed May 19, 1967
[45] Patented Nov. 24, 1970
[73] Assignee A. B. Chance Company
Centralia, Missouri
a corporation of Missouri, by mesne assignments

[54] ROTOR AND MANIFOLD STRUCTURE FOR JOINT OF ARTICULATING AERIAL DEVICE
10 Claims, 6 Drawing Figs.
[52] U.S. Cl. .................................................. 137/615,
182/2; 308/74
[51] Int. Cl. .................................................. F17d 1/00,
F16c 13/04; E04g 1/20
[50] Field of Search .................................................. 182/2;
137/615; 212/144, 8, 9; 308/23, F.B., 74

[56] References Cited
UNITED STATES PATENTS
2,558,815 7/1951 Briney ............................ 308/F.B.

3,132,718 5/1964 Pierce ............................ 182/2
3,304,134 2/1967 Allen ............................ 308/74
FOREIGN PATENTS
538,584 1/1956 Italy ............................ 308/F.B.

Primary Examiner—William F. O'Dea
Assistant Examiner—Howard M. Cohn
Attorney—Schmidt, Johnson, Hovey, Williams & Chase ABSTRACT: Rotor structure for rotatably interconnecting a pair of boom elements of an articulated aerial device. The rotor structure is rigid with one of the elements and is mounted for rotation at one extremity of the other element. The rotor includes a sheave portion for transforming a linear force applied by a cable drive mechanism into a rotational force for swinging the element which is rigid with the rotor. A combined thrust and journal bearing is provided to prevent shifting of the rotor along its axis of rotation while accommodating transmission of normal forces between the boom elements. The mechanism includes a plurality of flexible hoses of a length to permit relative rotation of the elements and a guide is provided for positioning the hoses to preclude damage to the same during relative rotation of the boom elements.

Patented Nov. 24, 1970

INVENTOR
William A. Prescott

BY
Hovey, Schmidt, Johnson & Hovey.
ATTORNEYS.

INVENTOR
William A. Prescott

BY Hovey, Schmidt, Johnson & Hovey.
ATTORNEYS.

ROTOR AND MANIFOLD STRUCTURE FOR JOINT OF ARTICULATING AERIAL DEVICE

This invention relates to improvements for use with articulated aerial devices and particularly to improved rotor structure for rotatably interconnecting a pair of elongated boom elements of a hydraulically actuated aerial device for facilitating hydraulic intercommunication between the elements without interfering with the relative rotatability thereof.

Articulated aerial devices of the type illustrated and disclosed in U.S. Letters Pat. No. 2,815,250, entitled "Machine With Elevatable And Traveling Carriage", issued Dec. 3, 1957; No. 3,066,756, entitled "Fire Fighting Apparatus Or The Like And Controls Therefor", issued Dec. 4, 1962; and No. 3,064,754, entitled "Fire Fighting Apparatus Or The Like Having Deicing Means", issued Nov. 20, 1962, all of which patents are assigned to the assignee of the instant invention, have been put to various uses where it is necessary that a workman perform operations at an elevated height above the ground.

The articulated aerial devices as shown in the above patents conventionally include a turntable mounted on the frame of a vehicle for rotation on a substantially vertical axis, with the table, in turn, carrying a pair of articulated, horizontally swingable booms, each movable independently of the other to permit selective change in the elevation of the outer extremity of the normally upper boom. A bucket unit swingably mounted on the outer end of the upper boom is adapted to carry one or more workmen with leveling mechanism being provided for maintaining the bucket in a horizontal position regardless of the elevation thereof during swinging of the booms. Such articulated aerial devices are preferably hydraulically actuated because of the inherent flexibility of hydraulic control, and additionally, it is desirable for a workman on the elevated platform to be able to control the actuation of the boom. Therefore, it is necessary to transmit hydraulic fluid between the relatively rotatable boom elements without obstructing the rotatability thereof.

In order to provide structure actuated by hydraulic piston and cylinder mechanism for swinging the outer boom through an arc of 270° or greater relative to the lower boom, the booms should preferably be rotatably interconnected in longitudinally offset relationship. However, such offset presents a problem in itself with respect to transfer of hydraulic fluid through the rotary joint between the booms. Additionally, the fluid transmission means also should not interfere with the rotor employed to join the two boom elements.

It is, therefore, the primary object of the instant invention to provide structure for rotatably interconnecting a pair of boom elements swingable relatively through an arc substantially exceeding 180° and including novel mechanism for transmitting hydraulic fluid through the rotary joint notwithstanding the fact that the booms are interconnected in longitudinally offset relationship.

Another very important object of the invention is to provide rotor structure for rotatably intercoupling a pair of aerial platform boom elements in longitudinally offset relationship wherein novel annular bearing means is provided between opposed extremities of the rotor structure in surrounding relationship thereto for not only carrying the latter but also confining the same against lateral movement, thereby permitting the use of a cylindrical rotor for passage of fluid transmission means therethrough. In this connection such bearing means also provides assembly and manufacturing advantages in the fabrication of the machines.

A further important object of the invention is to provide an aerial platform device having rotor structure as described wherein the cylindrical rotor serves to mount a manifold having a plurality of fluid passages therethrough whereby a plurality of independent hydraulic fluid flows may be transmitted through the rotary joint by the provision of separate flexible hoses coupled to the respective manifold passages and extending to the adjacent boom element.

An important object of the invention is to provide rotor structure in combination with manifold and flexible hose hydraulic fluid transmitting mechanism as described above wherein a guide is provided in association with the manifold hoses to engage and preclude the same from kinking during relative rotation of the boom elements.

Also an important object of the invention is to provide an aerial platform device having a pair of boom elements with linear acting boom rotating mechanism being mounted on the lower boom element and wherein the rotor structure rotatably interconnecting the boom elements in longitudinally offset relationship includes a rotor having a sheave portion aligned with the boom rotating mechanism and operably coupled thereto through the medium of a flexible cable, a flange portion spaced from the sheave portion and rigidly coupled to the upper, rotatable boom element, and bearing means carried by the lower boom element and surrounding the rotor between the sheave portion and the flange portion thereof so that support for and confinement of the rotor is accomplished at a position between the linear acting boom rotating mechanism and the upper boom element to provide the most effective equalization of all forces on the rotor.

Figure 1:
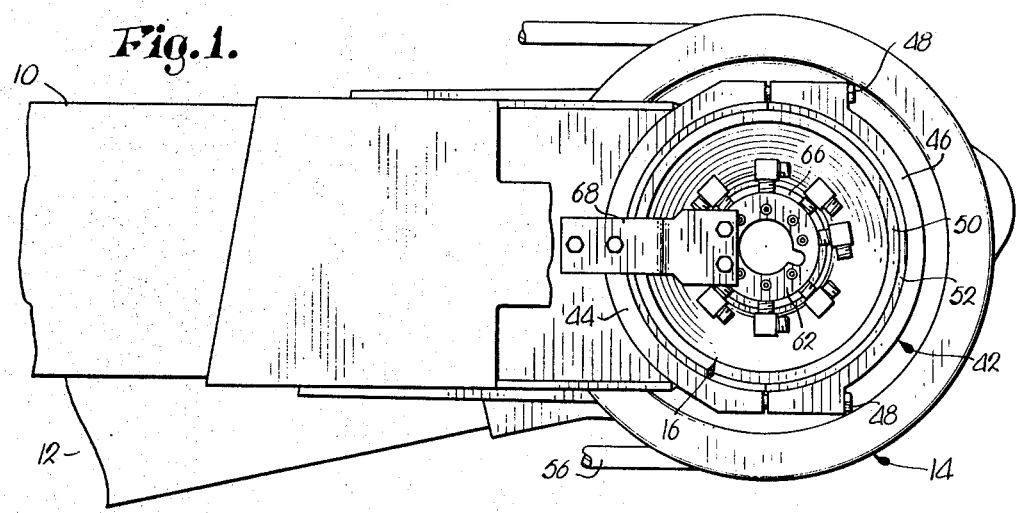
FIG. 1 is a side elevational view of a pair of relatively rotatable boom elements of an articulated aerial device, the boom elements being rotatably interconnected and hydraulically coupled in accordance with the concepts and principles of the instant invention.

A pair of boom elements 10 and 12 of an articulated aerial device (not shown) are interconnected for relative rotation about a horizontal axis by structure broadly designated by the numeral 14 which embodies the concepts and principles of the instant invention. It is to be understood that boom element 10 is preferably the normally lower boom element of the device which is mounted on a turntable (not shown) for rotation about a horizontal axis relative to the turntable, the latter being rotatable about a vertical axis. Boom element 12 is preferably the normally upper boom element which carries an elevated platform or bucket (not shown) at its outer free end remote from structure 14.

Figure 5:
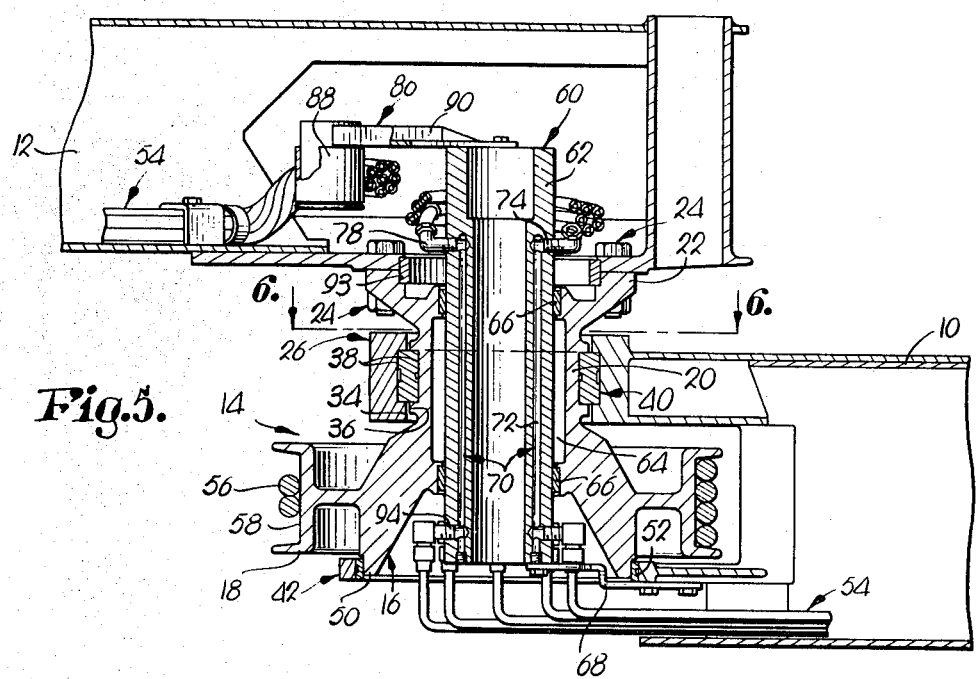
FIG. 5 is a cross-sectional view taken along line 5-5 of FIG. 3.
Figure 6:
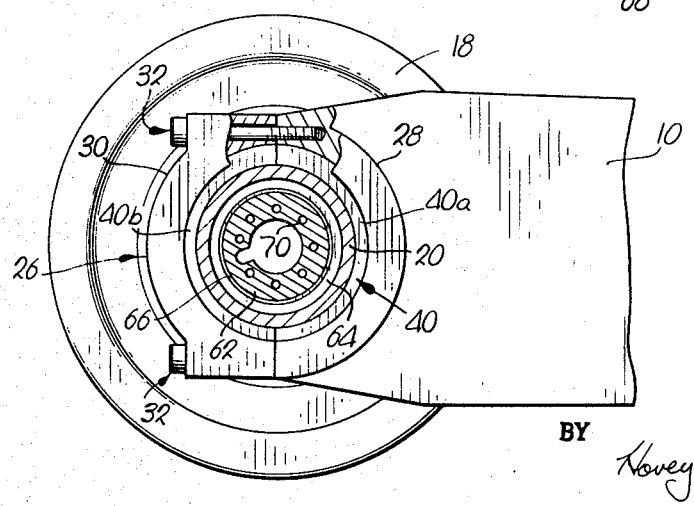
FIG. 6 is a cross-sectional view taken along line 6-6 of FIG. 5.

Structure 14 includes a rotor 16 rigid with boom element 12. Rotor 16 comprises a sheave portion 18, a journal section 20, and a flange 22, the latter being connected to element 12 by nut and bolt means 24, pilot portion 93 for alignment, and radial keys (not shown) for transmitting torsion. Portion 18 and section 20 are disposed in coaxial alignment with flange 22. Section 20 is located between element 12 and sheave portion 18, the latter being disposed substantially centrally with respect to element 10 as can be seen viewing FIG. 5.

Bearing means, including a ring member 26, is mounted at the end of boom element 10 proximal to rotor 16. Member 26 includes a pair of opposed hemicircular saddles 28 and 30, the latter being clamped together in surrounding relationship with respect to journal section 20 by fastener means 32. Ring member 26 and journal section 20 have respective opposed, facing annular surfaces 34 and 36, each having a groove 38 extending circumferentially therearound. The grooves 38 are disposed in radial alignment and receive an annular bearing 40 therebetween, the latter including a pair of half circles 40a and 40b which facilitate assembly of structure 14.

Structure 14 includes a second split ring bearing assembly 42 having opposed hemicircular elements 44 and 46 clamped together by stud bolts 48 in surrounding relationship to an annular lip 50 disposed on the opposite side of sheave portion 18 from journal section 20. A bearing ring 52 is clamped between assembly 42 and lip 50 as can best be seen in FIG. 5.

Power means including a cable 56 is wrapped around the outer periphery 58 of sheave portion 18 and is firmly attached to structure 14. Thus, it can be seen viewing FIGS. 1 and 5, that linear movement of cable 56 will cause rotation of sheave portion 18 to thereby rotate boom element 12 relative to boom element 10. Cable 56 is preferably driven by a piston and cylinder assembly (not shown) mounted on boom element 10.

It has been found that the support provided by bearing assembly 42 complements the support provided by bearing 40 and the components associated with the latter; however, it is to be appreciated that bearing assembly 42 is included to provide a safety factor and is not essential in practicing the instant invention. In this respect it is to be noted that bearing 40 cooperates with the shoulders presented by grooves 38 to prevent lateral movement of rotor 14 along its axis of rotation relative to boom element 10.

A bundle of hydraulic fluid transmission tubes is mounted on each of the boom elements 10, 12 respectively. Each bundle 54 may include any number of tubes; however, in the preferred embodiment illustrated in the drawings, each bundle is provided with eight tubes.

An apparatus 60 intercommunicates respective tubes of bundles 54 to permit hydraulic actuation of the aerial device and relative rotation of boom elements 10 and 12. Apparatus 60 includes an elongated, transversely circular member 62 which projects through a central bore 64 which extends along the axis of rotation of rotor 16 therethrough. Spaced bearing means 66 are disposed between member 62 and rotor 16 so that the latter is rotatable relative to member 62. A bracket 68 is bolted to boom element 10 and to member 62. A bracket 68 is bolted to boom element 10 and to member 62 and thus the latter is maintained in a fixed position relative to boom element 10. Member 62 is provided with a number of U-shaped passageways 70, each having a length 72 extending longitudinally of member 62 and a pair of radially extending termini 74 and 94, the termini 74 being disposed at the end of member 62 adjacent boom element 12, and the termini 94 being disposed at the end of member 62 adjacent to the boom element 10. A connecter assembly 76 is provided for communicating each of the passageways 70 with a respective tube of the bundle 54 on boom element 10.

An L-shaped pipe fitting 78 is received in each terminus 74, it being understood that the latter are spaced around the outer periphery of member 62 and a flexible hose 80 intercommunicates each of the fittings 78 with a respective tube of the bundle 54 on boom element 12. Thus, it is to be appreciated that the member 62 and the flexible hose means 82 presented by the hoses 80 provide fluid conveying means for intercommunicating respective tubes of the bundles 54. In this respect, it can be seen that a pair of clamps 84 are provided for bundling the hoses 80 together to form flexible hose means 82. Also, it is to be appreciated that the fittings 78 are disposed so that each of the hoses 80 extend from their respective fitting 78 around member 62 in the same direction.

Apparatus 60 also includes a hose guide in the nature of an L-shaped component 86 having an arm 88 which extends in spaced parallelism with respect to member 62 and a radial leg 90 bolted to the end of member 62. Flexible hose means 82 has a stretch 92 which extends between member 62 and arm 88 and therebeyond. Manifestly, flexible hose means 82 is sufficiently long to permit rotation of boom element 12 relative to boom element 10 in a counterclockwise direction from the position illustrated in FIG. 2, beyond the intermediate position illustrated in FIG. 3, and into the position indicated in FIG. 5.

Figure 3:
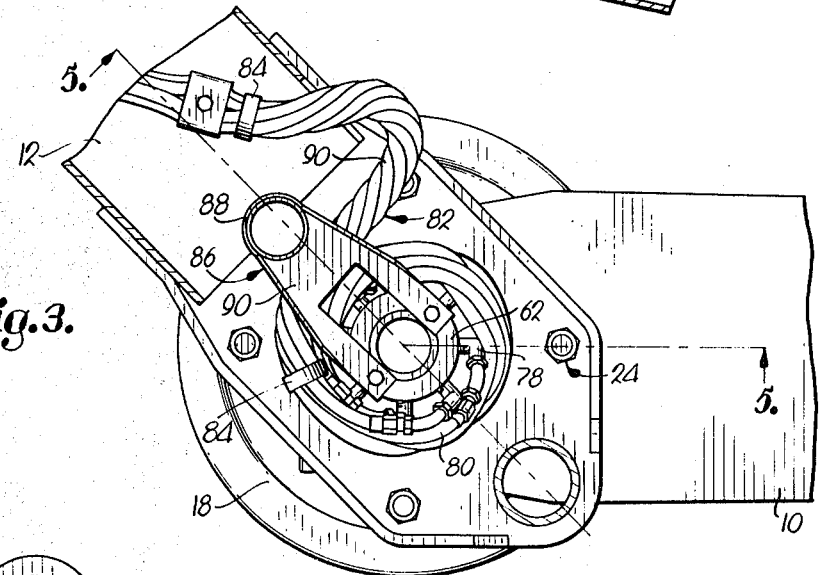
FIG. 3 and 4 are similar to FIG. 2 showing the upper boom element at two different stages of rotation.
Figure 4:
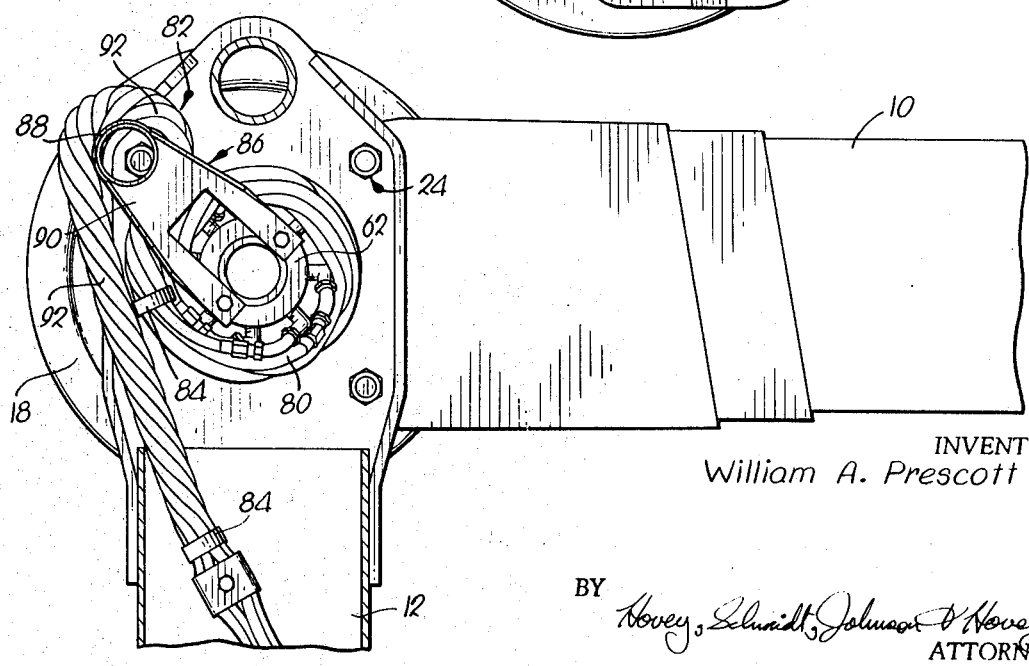

Viewing FIG. 4 it can be seen that arm 88 is disposed to cause the stretch 92 of flexible hose means 82 to loop therearound in the opposite direction to the direction of looping of hoses 80 around member 62. Thus, upon actuation of the device to cause boom element 12 to rotate in a clockwise direction from the position thereof indicated in FIG. 4, the loop formed by stretch 92 around arm 88 will move with boom element 12 into the position illustrated in FIG. 3 and, upon further movement of boom element 12 in a clockwise direction, the flexible hose means 82 will move into the position illustrated in FIG. 2. Thus, kinking and resultant damage to hose means 82 will be precluded. Manifestly, it can be seen that arm 88 is disposed to permit controlled bending of the flexible hose means 82 and to prevent the latter from moving into a position where the same may be caught between relatively moving components and damage thereby.

Figure 2:
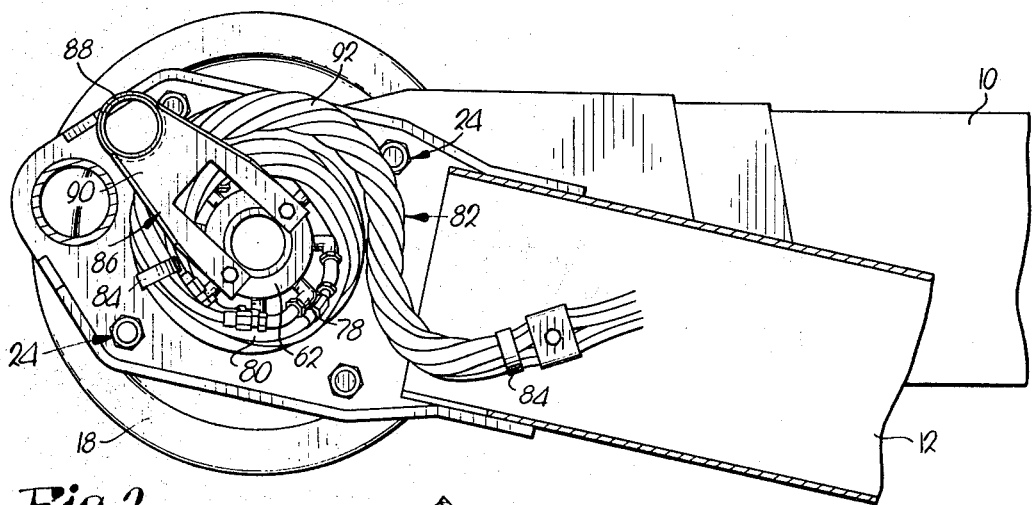
FIG. 2 is an elevational view taken from the opposite side thereof, certain parts having been broken away for increased clarity.

The novel principles and concepts embodied in the structure 14 permit rotation of boom element 12 relative to boom element 10 through an arc of more than 270° as can be seen by comparing the positions illustrated in FIGS. 2 and 4. This has been accomplished by the use of a sheave 18 which is driven by a linear force applied by cable 56. Bearing 40 and the components associated therewith, permit full relative rotation of the boom elements 10 and 12 while precluding relative lateral movement of the elements 10, 12 along their common axis of rotation. Furthermore, the configuration of rotor 16 permits placement of hydraulic fluid transmission means along the axis of rotation whereby the same may be generally located at a fixed position relative to both boom elements and the movement of the hydraulic fluid transmission means is thereby held to a minimum.

I claim:

1. In an aerial device having a pair of elongated boom elements, the combination with said elements of structure for rotatably interconnecting the elements comprising:

a rotor rigid with one of said elements having a sheave portion spaced from said one element and a journal section coaxial with said portion, said section being located between the portion and said one element and provided with a rigid segment defining an outwardly facing, circumferentially extending annular groove therein;

support means carried by the journal section of the rotor in a fixed position longitudinally of the rotor between the sheave portion thereof and said one element and having an outer split ring rotatable member provided with rigid segments cooperable to define an annular inwardly facing groove therein aligned with said annular groove in the rotor, said other element being secured to said member and substantially fully supported thereby for rotation of said other element relative to the one element;

annular bearing means in said aligned annular grooves; and power means on said other element coupled with said sheave portion for imparting a linear force on the periphery of the sheave portion to thereby rotate said one element relative to the other element.

2. The invention of claim 1, wherein said rotor includes means presenting a hollow bore extending along said axis through said sheave portion and said journal section and including hydraulic transmission tube means on each element respectively and apparatus intercommunicating said tube means to permit hydraulic actuation of the device and relative rotation of the elements, said apparatus comprising:

fluid-conveying means intercommunicating said tube means having an elongated member rigid with said other element and extending therefrom through said bore toward said one element and flexible hose means at the end of the member adjacent said one element extending in a direction transversely of said axis; and a hose guide mounted on said end of the member having an arm disposed in spaced parallelism with said axis, said arm being disposed for engaging said hose means during relative rotation of said one element in one direction to cause the hose means to form a loop bowed in the opposite direction whereby upon relative rotation of said one element in said opposite direction said loop moves with said one element to preclude kinking of the hose means.

3. The invention of claim 2, wherein said member and said bore are transversely round, the outer diameter of the member being less than the diameter of said bore.

4. The invention of claim 2, wherein said member is provided with a number of passageways therethrough, each passageway having a length extending longitudinally of the member and a terminus extending radially of the member at said end of the latter, said hose means including a hose for each of said termini.

5. In a hydraulically actuated aerial device having a pair of relatively rotatable boom elements and hydraulic fluid transmission tube means on each element, the combination with said elements and said tube means of apparatus for intercommunicating the tube means to permit relative rotation of the elements comprising:

fluid-conveying means intercommunicating said tube means and having flexible hose means extending in a direction transversely of the axis of relative rotation of said boom elements; and a hose guide mounted in fixed relationship to one of said elements and in radially spaced relationship with respect to said axis, said guide being disposed for engaging said hose means during relative rotation of the other of said elements in one direction to cause the hose means to form a loop bowed in the opposite direction whereby upon relative rotation of said other element in said opposite direction said loop moves with said other element to preclude kinking of the hose means.

6. The invention of claim 5, wherein said fluid-conveying means includes an elongated member rigid with said one element and extending therefrom toward said other element along said axis, said hose means being located at the end of said member proximal to said other member.

7. The invention of claim 6, wherein said hose means is wrapped around said member in said opposite direction and has a stretch extending between the member and hose guide, said stretch forming said loop during said rotation of the other element in said one direction.

8. The invention of claim 6, wherein said hose guide comprises and L-shaped component having a radially extending leg rigid with said member at said end thereof and an arm extending from said leg in spaced parallelism to said axis toward said one element.

9. The invention of claim 6, wherein said member is provided with a number of passageways therethrough, each passageway having a length extending longitudinally of the member and a terminus extending radially of the member at said end of the latter, said hose means including a hose for each of said termini.

10. The invention of claim 9, wherein each hose extends from its terminus around said member in said opposite direction, there being provided means bundling the hoses together for movement as a unit.